(12) United States Patent
Croft et al.

(10) Patent No.: US 12,487,141 B2
(45) Date of Patent: Dec. 2, 2025

(54) THERMAL CONDUCTIVITY VACUUM GAUGE ASSEMBLY

(71) Applicant: Edwards Limited, Burgess Hill (GB)

(72) Inventors: Glen Croft, Burgess Hill (GB); Nicholas Daniel Hutton, Burgess Hill (GB); Gary Michael George Lord, Burgess Hill (GB); Matthew Gareth Key, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 292 days.

(21) Appl. No.: 18/256,818

(22) PCT Filed: Dec. 10, 2021

(86) PCT No.: PCT/GB2021/053235
§ 371 (c)(1),
(2) Date: Jun. 9, 2023

(87) PCT Pub. No.: WO2022/129872
PCT Pub. Date: Jun. 23, 2022

(65) Prior Publication Data
US 2024/0019331 A1   Jan. 18, 2024

(30) Foreign Application Priority Data
Dec. 16, 2020   (GB) .................................... 2019852

(51) Int. Cl.
*G01L 21/12*   (2006.01)
*G01L 19/04*   (2006.01)
*G01L 19/14*   (2006.01)

(52) U.S. Cl.
CPC ............. *G01L 21/12* (2013.01); *G01L 19/04* (2013.01); *G01L 19/143* (2013.01)

(58) Field of Classification Search
CPC ....... G01L 19/00; G01L 19/04; G01L 19/143; G01L 21/00; G01L 21/10; G01L 21/12
See application file for complete search history.

(56) References Cited

U.S. PATENT DOCUMENTS

| 7,918,139 B2 * | 4/2011 | Kawasaki ............... G01L 21/12 |
| | | 324/460 |
| 2014/0026640 A1 | 1/2014 | Plochinger |
| 2015/0276536 A1 | 10/2015 | Gu et al. |

FOREIGN PATENT DOCUMENTS

| EP | 2995922 A1 | 3/2016 |
| GB | 1395242 | 5/1975 |

(Continued)

OTHER PUBLICATIONS

British Combined Search and Examination Report dated Jun. 17, 2021 and Search Report dated Jun. 16, 2021 for corresponding British application Serial No. GB2019852.9, 5 pages.

(Continued)

*Primary Examiner* — Nguyen Q. Ha
(74) *Attorney, Agent, or Firm* — Theodore M. Magee; Westman, Champlin & Koehler, P.A.

(57) ABSTRACT

The present disclosure relates to a thermal conductivity vacuum gauge assembly. The assembly comprises a body defining an internal chamber for receiving working gas and a heater element disposed within the chamber. The body is defined by a wall having an outer facing wall surface and an opposing inner facing wall surface. A thermal compensation element and a thermal equalisation element are in thermal communication with the body. The body is made of a material with a first thermal conductivity, and the thermal equalisation element is made of a material with a second thermal conductivity that is higher than the first thermal (Continued)

conductivity. The present disclosure also relates to a thermal conductivity vacuum gauge including the assembly.

13 Claims, 3 Drawing Sheets

(56) References Cited

FOREIGN PATENT DOCUMENTS

| | | | |
|---|---|---|---|
| JP | S4872483 | A | 9/1973 |
| JP | 3175319 | U | 5/2012 |

OTHER PUBLICATIONS

PCT Notification of Transmittal of the International Search Report and the Written Opinion of the International Searching Authority, or the Declaration and PCT Search Report dated Mar. 10, 2022 for corresponding PCT application Serial No. PCT/GB2021/053235, 5 pages.

PCT Written Opinion dated Mar. 10, 2022 for corresponding PCT application Serial No. PCT/GB2021/053235, 8 pages.

Japanese Notification of Reason for Rejection dated Jul. 30, 2024 for corresponding Japanese application Serial No. 2023-537118, 3 pages.

* cited by examiner

THERMAL CONDUCTIVITY VACUUM GAUGE ASSEMBLY

CROSS-REFERENCE OF RELATED APPLICATION

This application is a Section 371 National Stage Application of International Application No. PCT/GB2021/053235, filed Dec. 10, 2021, and published as WO 2022/129872A1 on Jun. 23, 2022, the content of which is hereby incorporated by reference in its entirety and which claims priority of British Application No. 2019852.9, filed Dec. 16, 2020.

FIELD

This disclosure relates to a thermal conductivity vacuum gauge assembly. This disclosure also relates to a thermal conductivity vacuum gauge including the assembly.

BACKGROUND

Vacuum gauges are commonly used to measure the pressure in a vacuum system. The pressure measurement can be used to check that the system has a vacuum of sufficiently low pressure for its intended purpose. If the measurement indicates that the pressure of the vacuum in the system is insufficiently low this can be used to indicate and detect a leak or defect in the system and/or provide feedback to aid control of a vacuum pump evacuating the system.

A common type of vacuum gauge used for this purpose is a thermal conductivity vacuum gauge.

Thermal conductivity vacuum gauges utilize the thermal conductivity of gases for the purpose of pressure measurements, and may also be known as heat-loss vacuum gauges. In general, these gauges utilise the relationship between the thermal conductivity of a gas and its pressure in order to arrive at a pressure measurement.

One such thermal conductivity vacuum gauge is a Pirani gauge.

In a Pirani gauge, a heater element (usually in the form of a filament or wire) is placed in contact with the working gas in the vacuum system and is connected into an electrical circuit that allows it to be heated using electrical energy. As gas molecules collide with the heater element they will transfer (i.e., conduct) heat away from it. If the gas is of a higher pressure, then there will be more molecules colliding with the heater element and so more heat will be transferred away from the heater element (i.e., the gas has a higher thermal conductivity).

If the heater element is held at a constant current or voltage, then changes in the amount of heat transferred from the heater element due to changing gas pressure will cause its temperature (and thus resistance) to change a proportional amount. By measuring this change in resistance, the change in pressure of the gas can be measured. Alternatively, the heater element can be held at a constant temperature (and thus resistance), and the change in voltage needed to maintain this constant temperature depending on the gas pressure can be measured.

In this manner, the pressure of the gas is measured as a function of its thermal conductivity.

As will be appreciated by the skilled person, a common way to implement this in a Pirani gauge is to include the heater element as an arm in a Wheatstone bridge circuit.

In order to determine a more accurate pressure measurement in a thermal conductivity gauge, a thermal compensation element is generally necessary.

The thermal compensation element is an element or component that measures the ambient temperature of the gauge itself. This allows the pressure measurement to be compensated for this.

This can be achieved, for example, by using the thermal compensation element to provide a reference resistance or voltage according to the ambient temperature of the gauge for comparison to that of the heater element. This can help minimise measurement inaccuracies and inconsistencies associated with the ambient temperature of the gauge unintentionally affecting the resistance or voltage reading of the heater element.

As will be appreciated by the skilled person, one way to implement this thermal compensation in a Pirani gauge is to include the thermal compensation element (e.g., a temperature-dependent resistor) as an arm in the same Wheatstone bridge circuit as the heater element.

The thermal compensation element is generally placed on the surfaces of a body or tube of the gauge assembly, and relies on thermal conduction through the body to determine the ambient temperature of the gauge assembly for the comparison to the heater element.

The gauge body will often experience a temperature gradient across its length. This is due to one end of the body normally containing active electronics (e.g., to power the gauge and measure and display pressure therein) that can act to heat the tube, and an opposite end being attached to the vacuum system, which can act as a heat sink.

Due to the often corrosive nature of process gases used in vacuum systems, the gauge assembly body is generally made of stainless steel (or other suitable corrosion resistant material). Although such a material provides acceptable corrosion properties for the gauge assembly, it has a relatively low thermal conductivity. For example, stainless steel has a thermal conductivity in the region of around 15 W/mK.

The relatively low thermal conductivity of the gauge assembly body means it can be relatively slow to communicate and equalise temperature gradients across the gauge body. This can result in a varying and inaccurate temperature compensation measurement during use of the gauge assembly, which can provide potential inaccuracies and inconsistencies in the resulting pressure measurement.

Previously, to try to reduce these inaccuracies and inconsistencies in pressure measurement, the thermal compensation element has been positioned at a particular position along the length of the body that represents the best 'average' temperature of the gauge body (e.g., such as half-way along the body). Unfortunately, this solution has some limitations, as the most accurate temperature position will change if e.g., the dissipation of heat from the electronics, ambient air temperature or vacuum system temperature changes, as occurs regularly during different stages of vacuum system operation. These changes will thus again introduce errors into the pressure measurement.

When measuring lower vacuum pressures and using a more compact Pirani gauge (which has a smaller filament and thus has lower sensitivity), the variance and errors found in the temperature compensation due to the thermal gradients and changes therein across the gauge body can be great enough to mask any pressure-related changes for the process gas being measured within the gauge. Thus, this issue can place a restriction on the size and pressure measurement sensitivity of the gauge that can be practically implemented.

Accordingly, a need exists to provide a thermal conductivity vacuum gauge assembly that improves on the above aspects. This can not only lead to a thermal conductivity vacuum gauge of increased accuracy and sensitivity, but can also allow more compact vacuum gauges to be realised.

Although this description generally exemplifies a Pirani gauge assembly, it is to be understood that any other suitable type of thermal conductivity vacuum gauge assembly (where a heater element with a temperature compensation element) may also benefit from this disclosure and are accordingly within the scope thereof. Such other thermal conductivity vacuum gauges may include, for example, a thermistor gauge assembly or a thermocouple gauge assembly.

The discussion above is merely provided for general background information and is not intended to be used as an aid in determining the scope of the claimed subject matter. The claimed subject matter is not limited to implementations that solve any or all disadvantages noted in the background.

SUMMARY

From one aspect, the present disclosure provides a thermal conductivity vacuum gauge assembly. The gauge assembly comprises a body defining an internal chamber for receiving working gas, a heater element disposed within the chamber, a thermal compensation element in thermal communication with the body; and a thermal equalisation element in thermal communication with the body. The body is defined by a wall having an outer facing wall surface and an opposing inner facing wall surface, and the body is made of a material with a first thermal conductivity, and the thermal equalisation element is made of a material with a second thermal conductivity that is higher than the first thermal conductivity.

The thermal equalisation element helps conduct heat across the body more quickly. This can help reduce the size of temperature gradients between different parts of the body and reduce variation and inaccuracy in the ambient body temperature communicated to the thermal compensation element. This can result in a more accurate pressure measurement being realised.

The thermal compensation element is an element for providing a measurement indicative of an ambient temperature of the body. In one example, the thermal compensation element is a resistance temperature detector (RTD). In other examples, the thermal compensation element is a thermistor (such as a positive temperature co-efficient (PTC) thermistor or a negative temperature co-efficient (NTC) thermistor).

In an embodiment of the above, the thermal equalisation element at least partially surrounds the internal chamber and is in thermal contact with the body.

In a further embodiment of the above, the thermal equalisation element at least partially surrounds the outer facing wall surface, and in yet a further embodiment, the thermal equalisation element forms an outer sleeve around the body. In such an embodiment, the thermal equalisation element fully surrounds the circumference of the body.

In another embodiment, the thermal equalisation element comprises at least one strip extending along the body.

In another embodiment, the thermal equalisation element is enclosed within the wall between the inner and outer facing wall surfaces. In further embodiments, the thermal equalisation element disposed within the wall is at least one strip or a sleeve disposed within the wall.

These embodiments provide configurations of the thermal equalisation element that provide good thermal contact with the body to reduce the size of temperature gradients between different parts of the body. It will be appreciated from the description below that certain ones of these configurations have manufacturing and assembly advantages over others.

In a further embodiment of any of the above, the second thermal conductivity is at least 10 times (or an order of magnitude) greater than the first thermal conductivity.

This gives the thermal equalisation element sufficient thermal conductivity compared to the body to conduct heat quickly enough to reduce the size of temperature gradients between different parts of the body to help reduce variation and inaccuracy in the ambient body temperature communicated to the thermal compensation element.

In certain suitable embodiments, the thermal equalisation element is made of a material that has a thermal conductivity of greater than or equal to 100 W/mK, greater than or equal to 150 W/mK, or greater than or equal to 200 W/mK.

In a further embodiment of any of the above, the body is made of stainless steel and the thermal equalisation element is made of aluminium. In another embodiment, the thermal equalisation element is made of copper.

In a further embodiment of any of the above, the thermal compensation element is located within a cavity defined in the wall.

In a further embodiment of any of the above, the assembly further comprises an electrical connection member mounted to the thermal compensation element, wherein at least some of a first portion of the electrical connection member is surrounded by the thermal equalisation element and a second portion of the electrical connection member protrudes out from the body.

The placement of the thermal compensation element in the cavity and/or the use of an electric connection member can help support the thermal compensation element in better thermal contact with the body to improve the accuracy of the temperature measurement thereof.

In a further embodiment of any of the above, the body extends along a longitudinal axis between a base and a top and has a sidewall extending between the base and the top, and the thermal equalisation element at least partially surrounds the sidewall and extends axially along the longitudinal axis.

Surrounding the sidewall surrounds a larger surface area of the body for improved thermal communication therewith.

In a further embodiment of the above, the body includes a radially extending shoulder that abuts the thermal equalisation element.

The shoulder can help support the thermal equalisation element in place, e.g., without the need for additional joining or bonding agents. This can facilitate the assembly and replaceability of the thermal equalisation element on the body.

In a further embodiment of the above, the base defines an inlet passage in fluid communication with the chamber, and includes a radially extending flange with a recess therein for receiving a seal.

The flange allows for a more secure fit of the assembly to a vacuum system and the recess (allowing for an O-ring seal therein) provides a better seal to be formed between the assembly and the vacuum system when in use.

In a further embodiment of any of the above, the heater element is a filament for heating by an electrical power source. In examples, the filament may be made of Platinum or Tungsten. Such an assembly may be known generally as a Pirani gauge assembly.

In another aspect, the present disclosure provides a thermal conductivity vacuum gauge. The gauge comprises the assembly of any of the embodiments of the above aspect, and a housing receiving and at least partially surrounding the body and the thermal equalisation element.

The housing and the connections thereto facilitated by the embodiments of the assembly allow for improved modularity and replaceability for the thermal conductivity vacuum gauge.

In an embodiment of the above, the housing includes a control circuit for providing electrical control of the heater element and the thermal compensation element.

The control circuit can allow the housing to act as a replaceable, modular add-on to the assembly that allows interrogation of the assembly pressure measurement.

Although certain advantages have been discussed in relation to certain features above, other advantages of certain features may become apparent to the skilled person following the present disclosure.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF DRAWINGS

One or more non-limiting examples will now be described, by way of example only, and with reference to the accompanying figures in which.

DETAILED DESCRIPTION

Figure 1:
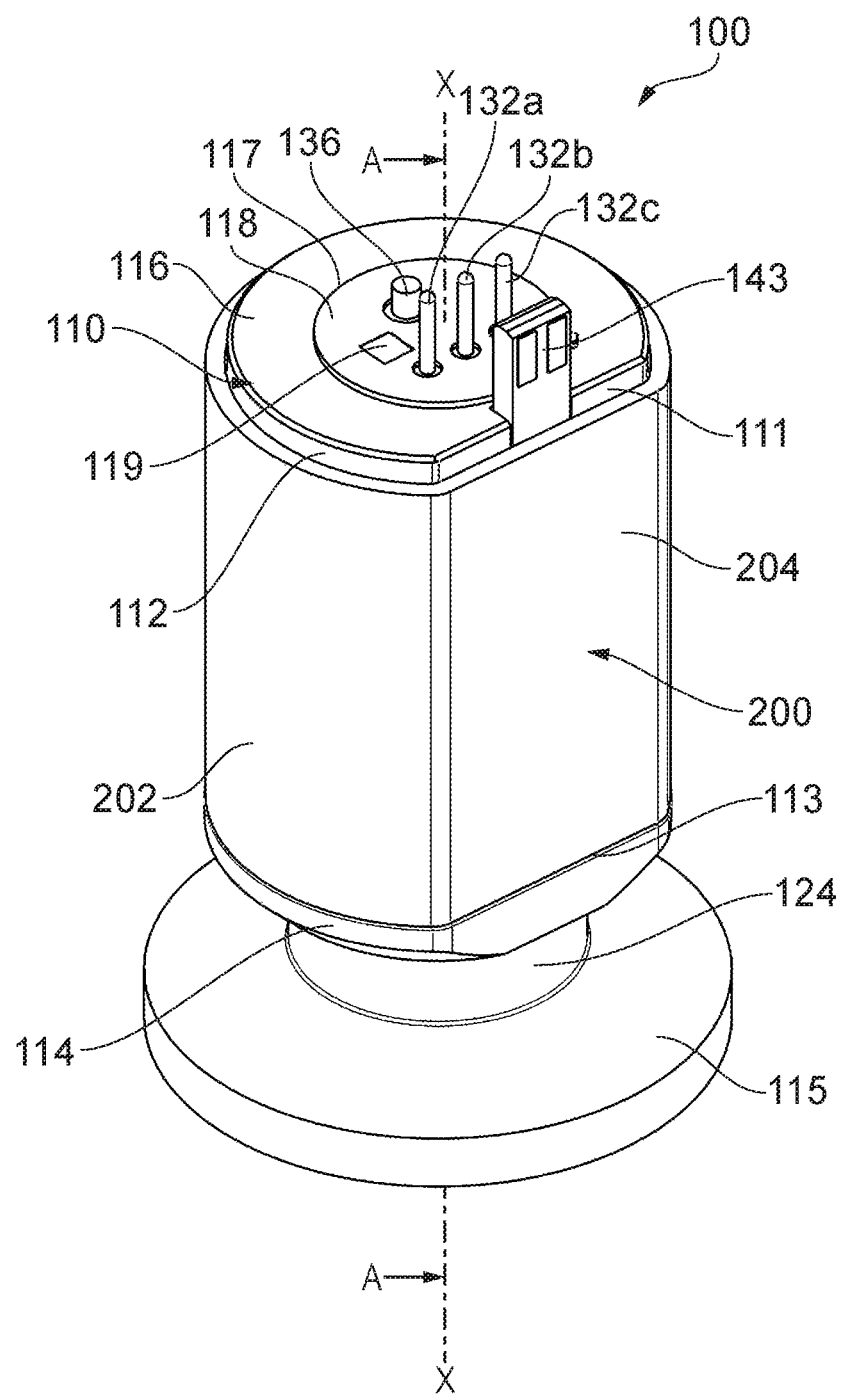
FIG. 1 shows an exterior isometric view of a thermal conductivity vacuum gauge assembly in accordance with an embodiment of the present disclosure.

Referring to FIG. 1, a thermal conductivity vacuum gauge assembly 100 is shown. The assembly 100 includes a body 110 that has a sidewall 112 that extends axially along a longitudinal axis X between a base 114 and a top 116. The body 110 includes a shoulder 113 that projects radially outward from the sidewall 112 at the base 114.

In the depicted embodiment, the body 110 is generally annular, but with a chamfered section 111 around a portion of the circumference. As discussed below, this chamfered section 111 can aid attachment and orientation of the assembly with other component parts of the thermal conductivity vacuum gauge (e.g., a housing or covering (not shown)).

Although a specific shape of body 110 is depicted, it should be understood that within the scope of this disclosure any other suitable shape of body 110 can be used (e.g., square or rectangular cross-section).

An inlet passage 124 extends axially from the base 114 and includes a flange 115 that extends radially therefrom. In one example, the flange 115 has a 16 mm nominal bore specification. In another example, the flange 115 has a 10 mm nominal bore specification. Although, any suitable type and dimension of flange 115 may be used within the scope of this disclosure.

The top 116 includes an end cap 118 through which electrical connector 132 and support features 136 for a heater element 130 protrude (discussed in more detail below with reference to FIG. 2), and are secured therein.

The end cap 118 is fixed within an opening 117 defined in the top 116.

In some embodiments, the end cap 118 may be fixedly attached to the top 116, for example, by being welded into the opening 117, or by being press-fit therein. In other embodiments, the end cap 118 may be removably fixed into the top 116 by threaded engagement therewith. Such removable fixation methods may facilitate repair and replacement of the heater element 130 and connection and support features. In yet further embodiments, the end cap 118 may be omitted and the top 116 extends radially across the top 116 without an opening 117 therein. In such embodiments, the connection and support features would extend through the top 116 itself.

In the depicted embodiment, the end cap 118 includes a marking area 119, which provides an area for the marking of various numbers or codes related to assembly manufacture (e.g., part number/bar code, batch number etc.). It should be understood that within the scope of this disclosure such a marking area 119 could alternatively be present on any other suitable part of the assembly 100 or omitted altogether.

Figure 2:
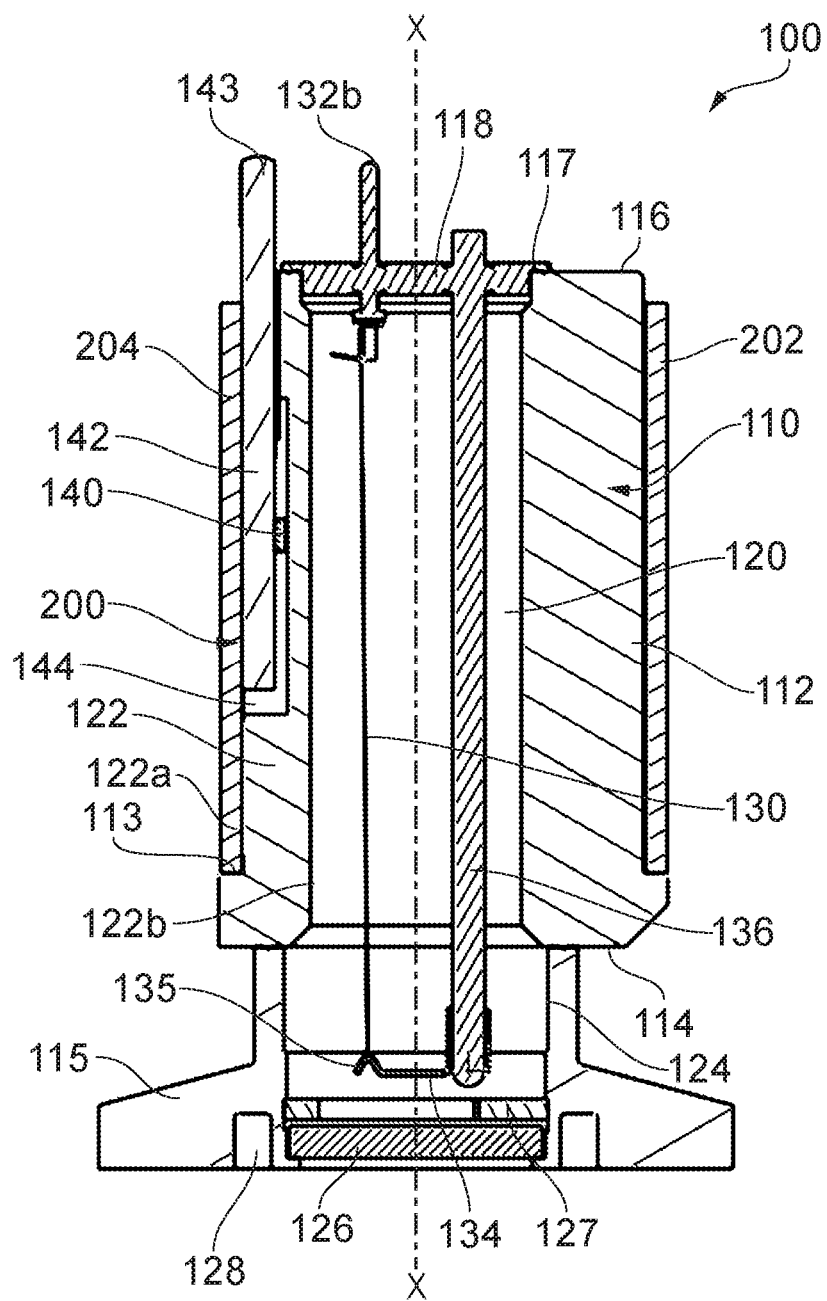
FIG. 2 shows a cross-section of the assembly of FIG. 1 viewed along line A-A.

FIG. 2 shows a cross-section of assembly 100 taken along the longitudinal axis X (along the line defined by arrows A-A) and viewed in the direction of arrows A-A. FIG. 2 gives a view of the internal structure and components within the body 110, as discussed below.

The body 110 defines an internal chamber 120 which is configured to receive working or process gas (e.g., from a vacuum system) when the assembly 100 is in use. By 'working' or 'process' gas, it is meant the gas (or gases) that the assembly intends to measure the pressure of. The 'working gas' is usually the gas (or gases) that are being worked on (e.g., being evacuated) by the vacuum system. The pressure of this gas can provide an indication of the general pressure of vacuum in the system.

In the depicted example, the body 110 is generally tubular, and may also be known as a 'body tube'. The internal chamber 120 is accordingly generally cylindrical about the longitudinal axis X within the body 110.

The body 110 is defined or formed by a wall 122. The wall 122 is defined between an outer facing wall surface 122a and an opposing, inner facing wall surface 122b. Surfaces 122a and 122b are generally annular in accordance with the depicted shape of the body 110. The outer facing wall surface 122a is radially outward of the inner facing wall surface 122b and faces the exterior of the assembly 100. The inner facing wall surface 122b faces the interior of the assembly 100 and defines (or encloses) the internal chamber 120.

As discussed above, the body 110 is generally made of a relatively low thermal conductivity, but corrosion resistant metal, such as a stainless steel. This allows the body 110 to withstand the potentially corrosive effects of the process gas.

The body 110 can be made from any suitable manufacturing method, such as by being moulded/cast, machined from a solid block or 3D printed.

The inlet passage 124 extends axially from the base 114 and into the chamber 120. The inlet passage 124 is in fluid communication with the chamber 120, and permits working gas (e.g., from a vacuum system) to enter and exit the chamber 120 during use.

A filter element 126 is disposed across the inlet passage 124 for filtering the working gas before it enters the chamber 120. The filter element 126 passes radially across the inlet passage 124 relative to the longitudinal axis X, and in the depicted embodiment is secured in place with a retaining ring 127 positioned in the inlet passage 124.

The filter element 126 is used to ensure contaminants do not enter the chamber 120. Such contaminants may damage the assembly 100 (e.g., by corroding or depositing on the heater element 130, wall surface 122b or electrical connections within the chamber 120) and/or may interfere with the pressure measurement process and provide inaccuracies therein.

In one example, the filter element 126 is a stainless steel mesh, although any other suitable type (e.g., a membrane) or material for filter element 126 may be used within the scope of this disclosure.

The flange 115 includes a recess or groove 128 defined therein. The recess 128 is annular around the longitudinal axis X and permits a seal to be seated therein. This can allow a better seal to be formed between the assembly 100 and a vacuum system when in use, and secured in position via the flange 115. The seal can be any suitable type of seal, such as an O-ring seal or a metallic seal. In other embodiments, a (e.g., metallic) gasket arrangement between the flange 115 and the system may be used instead.

A heater element 130 is disposed within the chamber 120. In the depicted example, the heater element 130 extends generally axially into the chamber 120 from the top 116 towards the base 114.

The heater element 130 in the depicted embodiment is a filament for heating by an electric power source. The filament may be made from any suitable material, such as Tungsten or Platinum. Platinum in particular, may be used in vacuum system environments or applications that are known to contain more corrosively aggressive agents and/or working gases.

Electrical connectors or pins 132a, 132b, 132c protrude through the end cap 118 and are secured therein. The heater element 130 is connected to certain ones of the electrical connectors 132a, 132b, 132c to permit electrical communication therewith for control of the heater element 130.

In the depicted example, the connectors 132a, 132c are connected to two opposing ends of the heater assembly 130, whilst the connector 132b is used for grounding purposes. The connectors 132a, 132b, 132c can be subsequently connected to a separate control circuit (not shown) that can provide electrical power to heat and control the heater assembly 130 when the assembly 100 is in use.

The heater element 130 can be connected in any suitable manner to connectors 132a, 132c, e.g., by being wrapped around a base of the connectors or welded or soldered thereto etc.

The heater element 130 is supported within the chamber 120 by a support structure. In the depicted example, the support structure is in the form of a spring arm 134 and a bar 136.

The bar 136 protrudes through end cap 118 and is secured thereto. The bar 136 extends axially into the chamber 120 from the top 116 towards the base 114 substantially parallel to the heater element 130. In the depicted embodiment, the bar 136 is a cylindrical rod.

The spring arm 134 is secured to the end of the bar 136 nearest the base 114, and extends radially (relative to the longitudinal axis X) to support the heater element 130.

The spring arm 134 features a hook 135 around which the heater element 130 is passed. The spring arm 134 and bar 136 are used to provide a tension that keep the heater element 130 taut and supported in use between the connectors 132a, 132c.

As will be appreciated, in the depicted embodiment, the heater assembly 130 provides a substantially V-shape or U-shape when hung between the connectors 132a, 132c via the hook 135.

Although one particular arrangement of the heater element 130, electrical connectors 132a, 132b, 132c and support structure thereof is shown, it is to be understood that within the scope of this disclosure any other suitable arrangement may be used. For example, different numbers and types of electrical connectors 132a, 132b, 132c, a different type of heater element 130 (e.g., a thermistor), and different numbers or types of components to bar 136 and spring arm 134 may be used.

A thermal compensation element 140 is held against the outer surface 122a of the wall 122 of the body 110 in a cavity 144 defined therein. In this manner, the thermal compensation element 140 is held in thermal communication with the body 110. This allows the thermal compensation element 140 to provide a reference reading for the ambient temperature of the body 110 to help adjust pressure measurements due to thermal conduction through the body 110 to the thermal compensation element 140.

For simplicity of assembly, it is desirable to maintain the thermal compensation element 140 against the outer surface 122a without any further joining or bonding. However, in certain examples, thermal paste could be applied between the surface 122a in the recess 144 and the thermal compensation element 140 making contact therewith, in order to improve the thermal contact between the two.

The thermal compensation element 140 may be of any suitable type e.g., that can provide a resistance and/or voltage indicative of an ambient temperature of the wall 122 against which it is disposed. In one example, the thermal compensation element 140 is a resistance temperature detector (RTD), such a Molybdenum or Platinum RTD. In another example, the thermal compensation element 140 is a thermistor, such as a positive temperature co-efficient thermistor (PTC) or a negative temperature co-efficient thermistor (NTC) made of powdered metal oxides or a polymer. In another example, the thermal compensation element 140 could be a solid-state temperature sensor.

Although other types of thermal compensation element 140 fall within the scope of the present disclosure, it is thought that the above offer certain durability, cost and accuracy advantages over others.

An electrical connection member 142 is mounted to the thermal compensation element 140 and is used to hold it in position against the body 110. The electrical connection member 142 also allows electrical communication between the thermal compensation element 140 and a control circuit (not shown) that can be connected thereto.

In the depicted embodiment, the electrical connection member 142 is a printed circuit board (PCB) of the FR-4 specification; however, any suitable type of electrical connection member 142 could be used instead, or a PCB of any other suitable specification. By using a PCB in the depicted embodiment, the electrical connection member 142 also provides a durable/rigid substrate that offers some mechanical support for the thermal compensation element 140, to hold it against the wall surface 122a.

A first portion of the electrical connection member 142 is held in the recess or cavity 144. A second portion protrudes axially out from the wall 122 from the top 116.

The first portion of the member 142 and the cavity 144 are sized and shaped such that the first portion can be push-fit and retained firmly therein to hold the thermal compensation element 140 in place against the wall surface 122a of the body 110 and maintain good thermal communication/contact therewith. Although, the electrical connection member 142 with element 140 thereon can be retained against the body 110 in another suitable manner, e.g., by the first portion of the electrical connection member 142 being adhesively fixed in the cavity 144.

The second portion of the electrical connection member 142 includes an electrical connector 143 that is suitable to provide an electrical connection between the member 142 and a control circuit (not shown), and allow electrical communication between such a control circuit and the thermal compensation element 140 to inform the pressure measurements made by the assembly 100.

In the depicted embodiment, the thermal compensation element 140 is surface mounted to the electrical connection member 142.

This permits the thermal compensation element 140 to be made integrally with the electrical connection member 142 as a one-piece component that has cost, installation and durability benefits.

Nonetheless, within the scope of this disclosure, any other suitable method of mounting thermal compensation element 140 to the member 142 may be used, such as through-hole or soldering techniques.

In other embodiments (not shown), the thermal compensation element 140 can be held against the outer surface 122a without a cavity 144 therein.

In other embodiments (also not shown), the thermal compensation element 40 and first portion of the electrical connection member 142 can be enclosed within the wall 122 (i.e., between surfaces 122a and 122b) instead being held against the outer surface 122a. This can be achieved by the cavity 144 being placed in the wall 122 between surface 122a and 122b and the thermal compensation element 140 and first portion of the electrical connection member 142 being secured therein. Such embodiments may improve the longevity/durability of the thermal compensation element 140 and member 142, as well as improve the amount of thermal contact between the thermal compensation element 140 and the wall 122 (for improved temperature compensation accuracy).

Although the depicted embodiments show the thermal compensation element 140, electrical connection member 142 and cavity 144 disposed generally in the sidewall 112 of the body 110, it is to be understood that they may be disposed at any other suitable part or portion of the body 110 defined by a wall 122 thereof (e.g., the base 114 or the top 116), as may suit a particular application or vacuum system.

Figure 3:
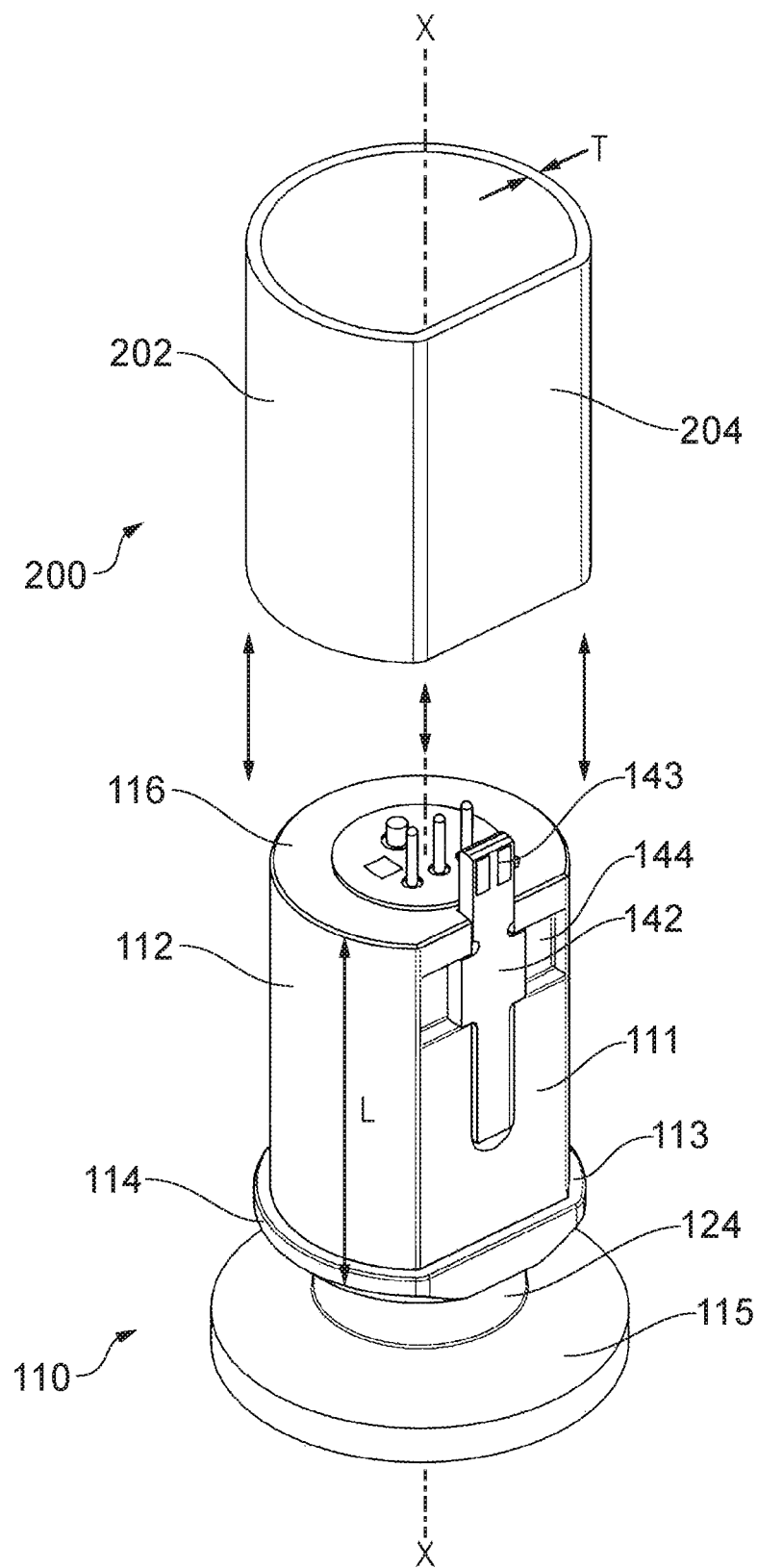
FIG. 3 shows the assembly of FIG. 1 with the thermal equalisation element removed.

As shown in FIGS. 1 and 2, the sidewall 112 of the body 110 is surrounded (or circumscribed) by a thermal equalisation element 200. FIG. 3 also shows the thermal equalisation element 200 having been removed from the body 110.

The thermal equalisation element 200 includes a cylindrical portion 202 and a chamfered portion 204 that corresponds to the contours of the sidewall 112 and the chamfered portion 111 of the body 110, respectively.

As shown in FIG. 3, the thermal equalisation element 200 (i.e., with portions 202 and 204) is sized and shaped such that it forms an outer sleeve that can be slid axially over the body 110 and abuts (or rests against) shoulder 113 in use.

The thermal equalisation element 200 is sized and shaped such that it is push-fit over the body 110 and retained in place by the push-fit (i.e., due to a slight interference between the sidewall 112 and the thermal equalisation element 200). This allows the thermal equalisation element 200 to make good thermal contact with the sidewall 112 of the body 110.

The push-fit provides simplicity of assembly and facilitates removability and replacement of the element 200, e.g., compared to a method that bonds or joins the element 200 to the body 110 instead. Having said this, however, any other suitable method of holding the element 200 to the body 110 is envisaged within the scope of this disclosure (such as welding or brazing or using adhesive). In certain examples, thermal paste could also be applied between the element 200 and the surface 122a/sidewall 112 of the body 110 in order to improve the retention and thermal contact between the two.

The thermal equalisation element 200 is made of a material that has a relatively high thermal conductivity compared to that of the body 110. In the depicted example, the thermal equalisation element 200 is made of aluminium (or an alloy thereof). Aluminium has a thermal conductivity in the region of around 230 W/mK, which is significantly greater than the around 15 W/mK thermal conductivity of an exemplary stainless steel generally used to make the body 110.

It is to be appreciated that the thermal equalisation element 200 in thermal communication with the body 110 will help conduct any heat generated at different points in the body 110 across the body 110 more quickly. This can help reduce problematic temperature gradients between different parts of the body 110 (e.g., from the heat from electronics at or near top 116 and a relatively cool heat sink at or near the base 114/flange 115), which can help reduce variation and inaccuracy in the ambient body temperature communicated to the thermal compensation element 140. This results in a more accurate pressure measurement being realised.

Although aluminium is exemplified, any other suitable material of sufficient thermal conductivity can also be used within the scope of this disclosure. For example, copper may be used, which has a thermal conductivity in region of around 400 W/mK.

In some examples, a suitable thermal equalisation element 200 is made of a material that has a thermal conductivity of greater than or equal to 100 W/mK, greater than or equal to 150 W/mK, or greater than or equal to 200 W/mK.

In further examples, the thermal conductivity of the thermal equalisation element 200 is made of a material that has a thermal conductivity at least 10 times (i.e., an order of magnitude) higher than that of the material that the body 100 is made of.

The thermal equalisation element 200 defines a wall thickness T (i.e., in the radial direction) that is of any suitable thickness. In some examples, the wall thickness can be between 1 mm-5 mm, or more narrowly, 2 mm-3 mm.

In the depicted example, the thermal equalisation element 200 is made by extrusion, which is a relatively low cost manufacturing process that provides a consistently sized element 200. Having said this, however, the thermal equalisation element 200 can be made by any other suitable method within the scope of this disclosure, e.g., by machining or additive manufacturing/3D printing.

The thermal equalisation element 200 extends axially along longitudinal axis X for a majority of the axial length L of the body 110 (i.e., defined between top 116 and base 114 thereof). The thermal equalisation element 200 can be any suitable axial length compared to the body 110, as long as it has a sufficient length to thermally contact enough of the body 110 to effectively equal out temperature gradients thereacross. It is to be appreciated that such a sufficient length allows the element 200 to extend a sufficient axial length over the heater element 130 (e.g., over the full or a majority of the axial length of the heater element 130).

In some suitable examples, the thermal equalisation element 200 extends between 50-100%, 60-100%, 70-100%, 75-100%, 80-100%, 75-95%, 75-90%, 75-85% or 75-80% of the axial length L of the body 110.

Although the depicted thermal equalisation element 200 wholly surrounds the sidewall 112 of the body 110 (i.e., around its circumference), it should be understood that in alternative embodiments, the thermal equalisation element 200 need only partially surround the sidewall 112 of the body 110 instead.

In such examples, the thermal equalisation element 200 would have a cut or break along its axial length, and thus be substantially C-shaped or U-shaped in axial cross-section. Such examples could advantageous be clipped around the body 110 rather than axially push-fit there over.

In other such examples, the thermal equalisation element 200 may instead be an axially extending strip of material, or a plurality thereof, that is secured to the sidewall 112.

Moreover, within the scope of this disclosure, the thermal equalisation element 200 needn't be limited to at least partially surrounding the outside of the body 110 (i.e., the outer wall 122a of the body 110) as depicted. The thermal equalisation element 200 could instead be disposed within the wall 122 of the body 110 itself (i.e., in the radial thickness of the wall 122 between the outer and inner wall surfaces 122a and 122b).

In such examples, as with the depicted examples, the thermal equalisation element 200 would still at least partially surround the chamber 120 (and the inner wall surface 122b of the body 100).

In such an example, the thermal equalisation element 200 could be fitted into an axially extending cavity within the wall 122 of the body 110 (between surfaces 122a, 122b) and make thermal contact with the body 110 therein. Alternatively, the element 200 could be integrally formed within the wall 122 when forming the body 110 (e.g., using additive manufacturing/3D printing).

As shown in the depicted embodiment, the thermal equalisation element 200 covers the recess 144 in which the thermal compensation element 140 is located. Such positioning is advantageous, as it provides thermal equalisation of gradients in the direct vicinity of the thermal compensation element 140, which can further help with providing a more accurate temperature measurement thereto. Accordingly, in some examples, the thermal equalisation element 200 surrounds the body 110 in at least the area where the thermal compensation element 140 is located (i.e., covers the radial cross-sectional area where the thermal compensation element 140 is positioned).

For example, in an alternative to the depicted embodiment, the thermal equalisation element 200 is a planar axial strip along the sidewall 112 covering the recess 144 containing the thermal compensation element 140.

In one example, a thermal conductivity vacuum gauge (not shown) is formed using the assembly 100 by it being received in a further housing or cover (not shown) that at least partially surrounds and passes over the thermal equalisation element 200 and body 110.

The housing can generally include the control circuit and/or electronics (e.g., remainder of a Wheatstone bridge circuit) that can be connected to the assembly 100 in order to control and operate the heater element 130 in combination with the thermal compensation element 140.

The electrical connectors 132a, 132b, 132c, 143 protruding from the assembly 100 can facilitate ease of integration with the housing, as they can simply be connected and disconnected to ports therein when the housing receives the assembly 100. This can also aid modularity and replaceability for the housing and assembly 100.

The housing can feature its own electrical connections/connectors that will allow the control circuit/electronics and the assembly 100 to be powered and interrogated, as necessary.

The housing can also feature a screen/readout thereon. This screen/readout can display/indicate the measured pressure value or other parameters associated with the gauge/assembly 100 (e.g., resistance, temperature, voltage etc.) and the vacuum system it is measuring.

As discussed briefly above, the shape of the body 110 and the thermal equalisation element 200, including chamfered sections 111 and 204, can be used to aid attachment of the housing. For example, the chamfered sections 111, 204 provide a flat axial surface to aid insertion and fitment of the housing on the element 200 and body 110. It may also provide an easy visual reference to ensure the housing is inserted over the element 200 and the body 110 in the correct orientation.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A thermal conductivity vacuum gauge assembly comprising:
   a body defining an internal chamber for receiving working gas, wherein the body is defined by a wall having an outer facing wall surface and an opposing inner facing wall surface;
   a heater element disposed within the chamber;
   a thermal compensation element in thermal communication with the body; and
   a thermal equalisation element in thermal communication with the body;
   wherein the body is made of a material with a first thermal conductivity, and the thermal equalisation element is made of a material with a second thermal conductivity that is higher than the first thermal conductivity.

2. The assembly of claim 1, wherein the thermal equalisation element at least partially surrounds the internal chamber and is in thermal contact with the body.

3. The assembly of claim 2, wherein the thermal equalisation element at least partially surrounds the outer facing wall surface.

4. The assembly of claim 3, wherein the thermal equalisation element forms an outer sleeve around the body.

5. The assembly of claim 3, wherein the thermal equalisation element comprises at least one strip extending along the body.

6. The assembly of claim 1, wherein the second thermal conductivity is at least 10 times greater than the first thermal conductivity.

7. The assembly of claim 1, wherein the body is made of stainless steel and the thermal equalisation element is made of aluminium.

8. The assembly of claim 1, wherein the thermal compensation element is located within a cavity defined in the wall.

9. The assembly of claim 1, further comprising an electrical connection member mounted to the thermal compensation element, wherein at least some of a first portion of the electrical connection member is surrounded by the thermal equalisation element and a second portion of the electrical connection member protrudes out from the body.

10. The assembly of claim 1, wherein:
the body extends along a longitudinal axis between a base and a top and has a sidewall extending between the base and the top; and
the thermal equalisation element at least partially surrounds the sidewall and extends axially along the longitudinal axis.

11. The assembly of claim 10, wherein the body includes a radially extending shoulder that abuts the thermal equalisation element.

12. The assembly of claim 10, wherein the base defines an inlet passage in fluid communication with the chamber, and includes a radially extending flange with a recess therein for receiving a seal.

13. The assembly of claim 1, wherein the heater element is a filament for heating by an electrical power source.

\* \* \* \* \*